US012595401B2

(12) United States Patent
Tanaka et al.

(10) Patent No.: US 12,595,401 B2
(45) Date of Patent: Apr. 7, 2026

(54) ADHESIVE SET, ADHESIVE BODY, AND METHOD FOR PRODUCING SAME

(71) Applicant: Resonac Corporation, Tokyo (JP)

(72) Inventors: Toru Tanaka, Tokyo (JP); Takashi Kawamori, Tokyo (JP); Masahiro Matsunaga, Tokyo (JP); Yosuke Fujiyasu, Tokyo (JP)

( * ) Notice: Subject to any disclaimer, the term of this patent is extended or adjusted under 35 U.S.C. 154(b) by 670 days.

(21) Appl. No.: 17/999,866

(22) PCT Filed: Nov. 15, 2021

(86) PCT No.: PCT/JP2021/041958

§ 371 (c)(1),
(2) Date: Nov. 25, 2022

(87) PCT Pub. No.: WO2022/107729

PCT Pub. Date: May 27, 2022

(65) Prior Publication Data

US 2023/0212439 A1 Jul. 6, 2023

(30) Foreign Application Priority Data

Nov. 17, 2020 (WO) ................. PCT/JP2020/042820

(51) Int. Cl.
| | |
|---|---|
| *C09J 133/08* | (2006.01) |
| *C09J 4/06* | (2006.01) |
| *C09J 11/04* | (2006.01) |
| *C09J 11/06* | (2006.01) |

(52) U.S. Cl.
CPC .............. *C09J 133/08* (2013.01); *C09J 4/06* (2013.01); *C09J 11/04* (2013.01); *C09J 11/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,106,928 A | * | 4/1992 | Skoultchi | ................... C09J 4/00 |
| | | | | 526/196 |
| 5,795,657 A | * | 8/1998 | Pocius | ...................... B32B 7/12 |
| | | | | 428/516 |

(Continued)

FOREIGN PATENT DOCUMENTS

| | | |
|---|---|---|
| CA | 2183873 | 8/1995 |
| CN | 1610731 | 4/2005 |

(Continued)

OTHER PUBLICATIONS

International Preliminary Report on Patentability with Written Opinion dated Jun. 1, 2023 for PCT/JP2020/042819.

(Continued)

*Primary Examiner* — Peter A Salamon
(74) *Attorney, Agent, or Firm* — SHIPWAY IP

(57) ABSTRACT

An adhesive set includes a main agent containing a decomplexing agent and an initiator containing an organoborane complex. At least one of the main agent and the initiator further contains a compound having a radically polymerizable group. At least one of the main agent and the initiator further contains a polymerization control agent. At least one of the main agent and the initiator further contains a peroxide.

8 Claims, 2 Drawing Sheets

CURING TIME [hr]

(56) References Cited

U.S. PATENT DOCUMENTS

| | | | | |
|---|---|---|---|---|
| 7,534,843 | B2 * | 5/2009 | Jialanella | C08F 4/52 |
| | | | | 526/236 |
| 8,742,050 | B2 * | 6/2014 | Wang | C08G 18/10 |
| | | | | 528/7 |
| 9,018,326 | B2 * | 4/2015 | Xie | C09J 4/00 |
| | | | | 526/204 |
| 2003/0195318 | A1 | 10/2003 | Moren | |
| 2015/0005442 | A1 * | 1/2015 | Nabuurs | C08L 75/04 |
| | | | | 526/263 |
| 2016/0347975 | A1 * | 12/2016 | Irie | B32B 7/12 |
| 2017/0313906 | A1 * | 11/2017 | Karp | C09J 4/00 |
| 2018/0237590 | A1 * | 8/2018 | Clough | C08G 75/12 |
| 2020/0339713 | A1 * | 10/2020 | Magenau | C08K 5/39 |
| 2023/0212439 | A1 | 7/2023 | Tanaka et al. | |

FOREIGN PATENT DOCUMENTS

| | | |
|---|---|---|
| CN | 1898082 | 1/2007 |
| CN | 101174089 | 5/2008 |
| CN | 103160237 | 6/2013 |
| CN | 104204007 | 12/2014 |
| CN | 107001861 | 8/2017 |
| CN | 107429143 | 12/2017 |
| CN | 108026276 | 5/2018 |
| JP | 2005-514489 | 5/2005 |
| JP | 2013-144792 | 7/2013 |
| JP | 2016-047901 | 4/2016 |
| JP | 2017-141438 | 8/2017 |
| JP | 2018-502939 | 2/2018 |
| JP | 2018-530645 | 10/2018 |
| KR | 10-2018-0042434 | 4/2018 |
| WO | 2010/147011 | 12/2010 |
| WO | 2016/077166 | 5/2016 |
| WO | 2016/171253 | 10/2016 |

OTHER PUBLICATIONS

International Preliminary Report on Patentability with Written Opinion dated Jun. 1, 2023 for PCT/JP2020/042820.

International Preliminary Report on Patentability with Written Opinion dated Jun. 1, 2023 for PCT/JP2021/041958.

Extended Search Report in corresponding European Application No. 20962374.3, dated Jul. 6, 2023.

International Search Report dated Jan. 12, 2021 for PCT/JP2020/042819.

International Search Report dated Dec. 21, 2021 for PCT/JP2021/041958.

International Search Report dated Jan. 12, 2021 for PCT/JP2020/042820.

SOEI Patent and Law Firm, Statement of Related Matters, dated Jan. 20, 2023.

Extended Search Report in corresponding European Application No. 21894603.6, dated Nov. 6, 2023.

* cited by examiner

ADHESIVE SET, ADHESIVE BODY, AND METHOD FOR PRODUCING SAME

CROSS-REFERENCE TO RELATED APPLICATIONS

This application is a 35 U.S.C. § 371 national phase application of PCT/JP2021/041958, filed on Nov. 15, 2021, which claims priority to international application PCT/JP2020/042820, filed on Nov. 17, 2020.

TECHNICAL FIELD

The present disclosure relates to an adhesive set, an adhesive body, and a manufacturing method therefor.

BACKGROUND ART

An adhesive composition containing an organoborane complex has been disclosed as an adhesive for plastics such as polyethylene and polypropylene (for example, Patent Literature 1). The organoborane complex is decomplexed by mixing with a decomplexing agent to provide organoborane. The organoborane acts as an initiator generating radicals by reaction with oxygen. A borinate radical generated here acts as a dormant species of atom transfer radical polymerization (ATRP) that continues growth reaction including surface grafting while suppressing chain transfer or termination reaction of a compound having a radically polymerizable group.

CITATION LIST

Patent Literature

Patent Literature 1: JP 2005-514489 A

SUMMARY OF INVENTION

Technical Problem

In the adhesive composition containing an organoborane complex, it has been studied that an adhesive strength is improved by adding a polymerization control agent such as a halogenated metal salt. It is inferred that, by adding such a polymerization control agent, the polymerization control agent acts as an additional dormant species of ATRP to compensate for the shortfall in the dormant species, the growth reaction of the compound having a radically polymerizable group is accelerated, and as a result, the effect of improving an adhesive strength is produced.

However, according to studies of the inventors of the present disclosure, it has been found that a time (curing time) until a sufficient adhesive strength is obtained is lengthened. When the curing time is lengthened, degradation in process adaptability may occur.

In this regard, a main object of the present disclosure is to provide an adhesive set which enables an adhesive composition having a sufficient adhesive strength and capable of shortening a curing time to be prepared.

Solution to Problem

The organoborane acts as an initiator generating radicals by reaction with oxygen, as described above. The inventors of the present disclosure have conducted studies to solve the above-described problems, and as a result, have found that oxygen is consumed by reaction to cause dissolved oxygen deficiency in the system so that generation of radicals is suppressed, and this causes the lengthening of the curing time. As a result of further intensive studies, it has been found that, by adding a peroxide, a sufficient adhesive strength is attained and the curing time can be shortened, thereby completing the invention of the present disclosure.

An aspect of the present disclosure relates to an adhesive set. This adhesive set includes a main agent containing a decomplexing agent and an initiator containing an organoborane complex. At least one of the main agent and the initiator further contains a compound having a radically polymerizable group. At least one of the main agent and the initiator further contains a polymerization control agent. The polymerization control agent may contain at least one selected from the group consisting of a halogenated metal salt and a compound having a thiocarbonylthio structure. At least one of the main agent and the initiator further contains a peroxide. According to such an adhesive set, it is possible to prepare an adhesive composition having a sufficient adhesive strength and capable of shortening a curing time. The reason why such an effect is produced is inferred that, by adding a peroxide, radical generation is continued by supplying oxygen from the peroxide, and surface grafting proceeds while controlling growth reaction with the polymerization control agent. Therefore, it is conceivable to express an adhesive strength of the adhesive composition prepared from the adhesive set and also to shorten a curing time.

Another aspect of the present disclosure relates to an adhesive body. This adhesive body includes a first adherend, a second adherend, and an adhesive layer bonding the first adherend and the second adherend to each other. The adhesive layer contains a cured product of an adhesive composition containing the main agent and the initiator of the above-described adhesive set.

Still another aspect of the present disclosure relates to a method for manufacturing the adhesive body. This method for manufacturing the adhesive body includes pasting the first adherend and the second adherend together with the adhesive composition containing the main agent and the initiator.

Advantageous Effects of Invention

According to the present disclosure, there is provided an adhesive set which enables an adhesive composition having a sufficient adhesive strength and capable of shortening a curing time to be prepared.

Furthermore, according to the present disclosure, there are provided an adhesive body and a manufacturing method therefor which use such an adhesive set.

DESCRIPTION OF EMBODIMENTS

Figure 1:
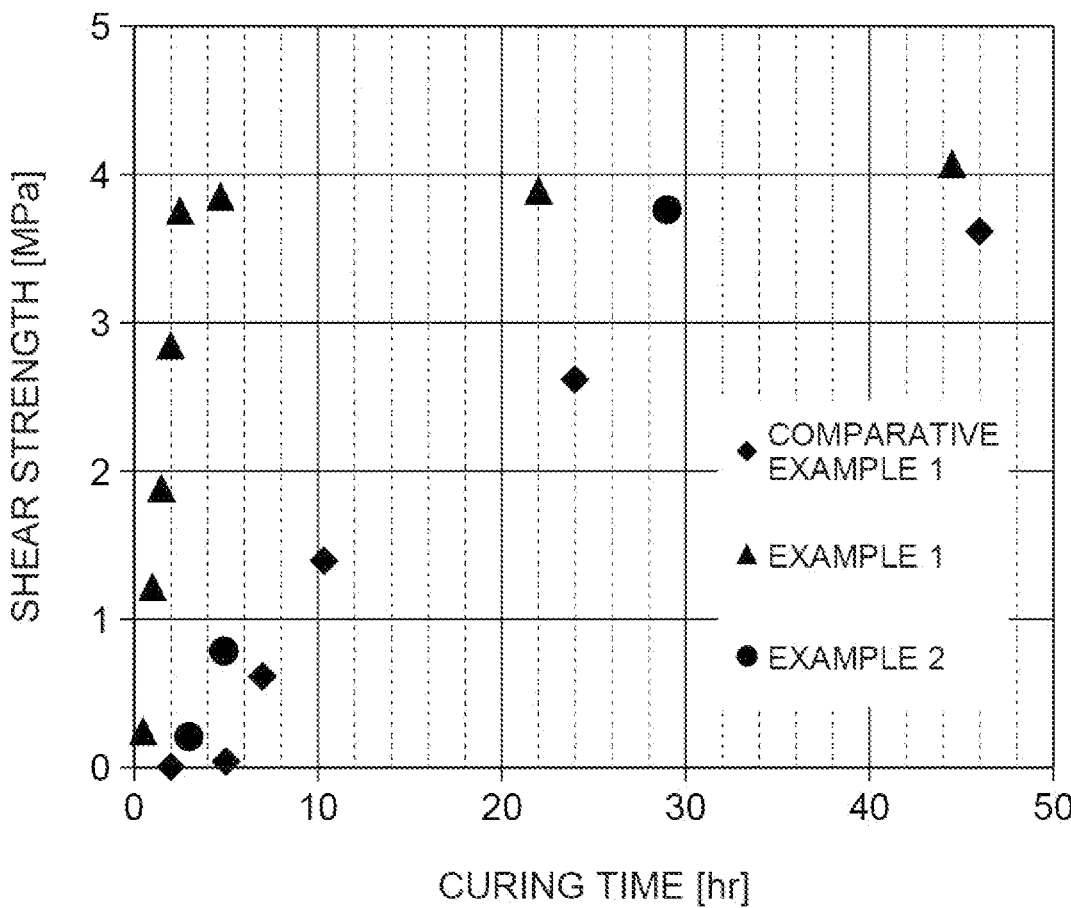
FIG. 1 is a graph showing a change in shear strength with respect to a curing time of Examples 1 and 2 and Comparative Example 1.

Hereinafter, embodiments of the present disclosure will be described. However, the present disclosure is not limited to the following embodiments.

The same applies to numerical values and ranges thereof in the present disclosure, and does not limit the present disclosure. In the present specification, a numerical range that has been indicated by use of "to" indicates the range that includes the numerical values which are described before and after "to", as the minimum value and the maximum value, respectively. In the numerical ranges that are described stepwise in the present specification, the upper limit value or the lower limit value described in a numerical range may be replaced with the upper limit value or the lower limit value in another numerical range that is described stepwise. Furthermore, in a numerical range described in the present specification, the upper limit value or lower limit value of the numerical range may be substituted by a value disclosed in the Examples.

In the present specification, the term "(meth)acrylate" means acrylate or methacrylate corresponding thereto. The same applies to other analogous expressions such as a (meth)acryloyl group and a (meth)acrylic copolymer. Furthermore, materials listed as examples below may be used singly or in combinations of two or more kinds thereof, unless otherwise specified. When a plurality of substances corresponding to each component exist in the composition, the content of each component in the composition means the total amount of the plurality of substances that exist in the composition, unless otherwise specified.

[Adhesive Set]

An adhesive set of an embodiment includes a main agent containing a decomplexing agent and an initiator containing an organoborane complex. In the adhesive set of the present embodiment, an adhesive composition containing the main agent and the initiator can be obtained by mixing the main agent and the initiator. According to such an adhesive set, by mixing the main agent and the initiator, it is possible to prepare an adhesive composition having a sufficient adhesive strength and capable of shortening a curing time.

The main agent contains a decomplexing agent. The initiator contains an organoborane complex. At least one of the main agent and the initiator further contains a compound having a radically polymerizable group. At least one of the main agent and the initiator further contains a polymerization control agent. At least one of the main agent and the initiator further contains a peroxide. At least one of the main agent and the initiator may further contain any of a filler, a plasticizer, a cross-linking agent, and the like. Hereinafter, respective components will be described.

(Organoborane Complex)

The initiator contains an organoborane complex. The organoborane complex means an organoborane-Lewis base complex obtained by coordinating a Lewis base to organoborane to form a complex. The organoborane-Lewis base complex is a compound that reacts with a decomplexing agent described below to provide organoborane. Since the organoborane causes radical cleavage in an oxygen atmosphere to generate a borinate radical or the like serving as a dormant species, the organoborane may act as an initiator of living radical polymerization. The organoborane may be, for example, alkylborane ($BR_3$, R: alkyl group). The Lewis base may be, for example, amine. The amine may be, for example, a compound having a plurality of amino groups, or a compound having at least an amino group constituting amine and a group (for example, an alkoxy group or the like) containing an atom (for example, an oxygen atom or the like) capable of coordinating to boron other than the nitrogen atom of the amino group. These compounds act as a multidentate ligand with respect to organoborane, and thus can be regarded as multidentate amine.

The organoborane complex may be an alkylborane-amine complex, and may be an alkylborane-multidentate amine complex. Examples of the organoborane complex include a triethylborane-1,3-diaminopropane complex, a triethylborane-diethylene triamine complex, a tri-n-butylborane-3-methoxy-1-propylamine complex, a tri-n-butylborane-1,3-diaminopropane complex, a triisobutylborane-1,3-diaminopropane complex, a triethylborane-1,6-diaminohexane complex, a triisobutylborane-1,3-diaminopropane complex, and a triisobutylborane-1,6-diaminohexane complex. These may be used singly or may be used in combination of two or more kinds thereof. Among these, the organoborane complex may be a triethylborane-1,3-diaminopropane complex or a tri-n-butylborane-3-methoxy-1-propylamine complex. As the organoborane complex, a commercially available product or a synthetic product may be used.

The content of the organoborane complex may be 0.1% by mass or more, 1% by mass or more, 3% by mass or more, or 5% by mass or more, on the basis of the total amount of the initiator, from the viewpoint of producing adhesive strength. The content of the organoborane complex may be 30% by mass or less, 20% by mass or less, 15% by mass or less, or 10% by mass or less, on the basis of the total amount of the initiator, from the viewpoint of storage stability.

The content of the organoborane complex may be 0.01% by mass or more, 0.05% by mass or more, 0.1% by mass or more, or 0.2% by mass or more, on the basis of the total amount of the main agent and the initiator, from the viewpoint of producing adhesive strength. The content of the organoborane complex may be 10% by mass or less, 5% by mass or less, 3% by mass or less, or 1% by mass or less, on the basis of the total amount of the main agent and the initiator, from the viewpoint of toughness of an adhesive layer.

The content of the organoborane complex may be 0.01 mol % or more, 0.05 mol % or more, 0.08 mol % or more, or 0.1 mol % or more, on the basis of the total amount of the compound having a radically polymerizable group, from the viewpoint of producing adhesive strength. The content of the organoborane complex may be 10 mol % or less, 5 mol % or less, 2 mol % or less, or 1 mol % or less, on the basis of the total amount of the compound having a radically polymerizable group, from the viewpoint of toughness of an adhesive layer.

(Decomplexing Agent)

The main agent contains a decomplexing agent. The decomplexing agent is a compound that dissociate a Lewis base in the organoborane complex (organoborane-Lewis base complex) so that organoborane can be generated. Therefore, the organoborane complex contained in the initiator and the decomplexing agent contained in the main agent are mixed to react with each other so that organoborane, which may be an initiator of living radical polymerization, can be generated.

Examples of the decomplexing agent include an acid, an acid anhydride, an aldehyde, and a β-ketone compound. These may be used singly or may be used in combination of two or more kinds thereof. Examples of the acid include Lewis acids such as $SnCl_4$ and $TiCl_4$ and Brønsted acids such as aliphatic carboxylic acid and aromatic carboxylic acid. Examples of the acid anhydride include acetic anhydride, propionic anhydride, succinic anhydride, maleic anhydride, and phthalic anhydride. Examples of the aldehyde include benzaldehyde, o-, m-, and p-nitrobenzaldehydes. Examples of the β-ketone compound include methyl acetoacetate, ethyl acetoacetate, t-butyl acetoacetate, and 2-methacryloyloxyethyl acetoacetate. Among these, the decomplexing agent may be an acid anhydride from the viewpoint of decomplexing reactivity between the decomplexing agent and the organoborane complex and storage stability of the initiator, and may be a succinic anhydride from the viewpoint of suppressing the blending mass of the decomplexing agent.

The content of the decomplexing agent may be 0.01% by mass or more, 0.1% by mass or more, 0.2% by mass or more, or 0.3% by mass or more, on the basis of the total amount of the main agent, from the viewpoint of shortening the curing time until an adhesive layer is cured to express an adhesive strength. The content of the decomplexing agent may be 10% by mass or less, 5% by mass or less, 3% by mass or less, or 2% by mass or less, on the basis of the total amount of the main agent, from the viewpoint of securing an operation time from application of the adhesive composition to adherends to pasting the adherends to each other.

The content of the decomplexing agent may be 0.01% by mass or more, 0.1% by mass or more, 0.2% by mass or more, or 0.3% by mass or more, on the basis of the total amount of the main agent and the initiator, from the viewpoint of shortening the curing time until an adhesive layer is cured to express an adhesive strength. The content of the decomplexing agent may be 10% by mass or less, 7% by mass or less, 5% by mass or less, or 3% by mass or less, on the basis of the total amount of the main agent and the initiator, from the viewpoint of securing an operation time from application of the adhesive composition to adherends to pasting the adherends to each other.

The molar amount ratio of the decomplexing agent with respect to the organoborane complex (the molar amount of the decomplexing agent/the molar amount of the organoborane complex) may be, for example, 0.3 or more, 0.5 or more, 0.8 or more, or 1 or more. When the molar amount ratio is 1 or more, there is a tendency that a more sufficient adhesive strength is obtained. The molar amount ratio of the decomplexing agent with respect to the organoborane complex (the molar amount of the decomplexing agent/the molar amount of the organoborane complex) may be, for example, 50 or less, 30 or less, 10 or less, 7 or less, 5 or less, or 3 or less. As the molar amount ratio is decreased, there is a tendency that an operation time from application of the adhesive composition to adherends to pasting the adherends to each other can be more sufficiently secured.

(Compound Having Radically Polymerizable Group)

At least one of the main agent and the initiator further contains a compound having a radically polymerizable group. The compound having a radically polymerizable group is a compound having a polymerizable group that reacts by radicals. Examples of the radically polymerizable group include a (meth)acryloyl group, a vinyl group, an allyl group, a styryl group, an alkenyl group, an alkenylene group, and a maleimide group.

The compound having a radically polymerizable group may contain, for example, a compound having a (meth) acryloyl group. Examples of the compound having a (meth) acryloyl group include a monofunctional (meth)acrylate having one (meth)acryloyl group, a polyfunctional (meth) acrylate having two or more (meth)acryloyl groups, and a (meth)acrylamide derivative.

Examples of the monofunctional (meth)acrylate include (meth)acrylic acid; alkyl (meth)acrylates having an alkyl group such as methyl (meth)acrylate, ethyl (meth)acrylate, n-butyl (meth)acrylate, isobutyl (meth)acrylate, tert-butyl (meth)acrylate, n-pentyl (meth)acrylate, n-hexyl (meth) acrylate, n-octyl (meth)acrylate, isooctyl (meth)acrylate, 2-ethylhexyl (meth)acrylate, isodecyl (meth)acrylate, dodecyl (meth)acrylate (n-lauryl (meth)acrylate), isomyristyl (meth)acrylate, stearyl (meth)acrylate, and isostearyl acrylate; alkenyl (meth)acrylates having an alkenyl group such as 3-butenyl (meth)acrylate; (meth)acrylates having an aromatic group such as benzyl (meth)acrylate and phenoxyethyl (meth)acrylate; alkoxy polyalkylene glycol (meth) acrylates such as methoxy tetraethylene glycol (meth)acrylate, methoxy hexaethylene glycol (meth)acrylate, methoxy octaethylene glycol (meth)acrylate, methoxy nonaethylene glycol (meth)acrylate, methoxy polyethylene glycol (meth) acrylate, methoxy heptapropylene glycol (meth)acrylate, ethoxy tetraethylene glycol (meth)acrylate, butoxy ethylene glycol (meth)acrylate, and butoxy diethylene glycol (meth) acrylate; (meth)acrylates having an alicyclic group such as cyclohexyl (meth)acrylate, isobornyl (meth)acrylate, and dicyclopentanyl (meth)acrylate; (meth)acrylates having a hydroxyl group such as 2-hydroxyethyl (meth)acrylate, 3-hydroxypropyl (meth)acrylate, and 4-hydroxybutyl (meth) acrylate; (meth)acrylates having an amino group such as N,N-dimethylaminoethyl (meth)acrylate; (meth)acrylates having an isocyanate group such as 2-(2-methacryloyloxyethyloxy)ethyl isocyanate and 2-(meth)acryloyloxy ethyl isocyanate; polyalkylene glycol mono(meth)acrylates such as tetraethylene glycol mono(meth)acrylate, hexaethylene glycol mono(meth)acrylate, octapropylene glycol mono (meth)acrylate, dipropylene glycol mono(meth)acrylate, tripropylene glycol mono(meth)acrylate, and octapropylene glycol mono(meth)acrylate; and (meth)acrylates having a siloxane skeleton. These may be used singly or may be used in combination of two or more kinds thereof.

Examples of the polyfunctional (meth)acrylate include aliphatic (meth)acrylates such as ethylene glycol di(meth) acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, ethoxylated polypropylene glycol di(meth)acrylate, 1,3-butanediol di(meth)acrylate, 1,4-butanediol di(meth)acrylate, neopentyl glycol di(meth)acrylate, 3-methyl-1,5-pentanediol di(meth)acrylate, 1,6-hexanediol di(meth)acrylate, 2-butyl-2-ethyl-1,3-propanediol di(meth)acrylate, 1,9-nonanediol di(meth)acrylate, 1,10-decanediol di(meth)acrylate, glycerin di(meth)acrylate, tricyclodecanedimethanol (meth)acrylate, and ethoxylated 2-methyl-1,3-propanediol di(meth)acrylate; aromatic (meth)acrylates such as ethoxylated bisphenol A type di(meth)acrylate, propoxylated bisphenol A type di(meth)acrylate, ethoxylated propoxylated bisphenol A type di(meth)acrylate, ethoxylated bisphenol F type di(meth)acrylate, propoxylated bisphenol F type di(meth)acrylate, ethoxylated propoxylated bisphenol F type di(meth)acrylate, ethoxylated fluorene type di(meth)acrylate, propoxylated fluorene type di(meth)acrylate, and ethoxylated propoxylated fluorene type di(meth)acrylate; and aromatic epoxy (meth)acrylates such as bisphenol type epoxy (meth)acrylate, phenol novolac type epoxy (meth) acrylate, and cresol novolac type epoxy (meth)acrylate. These may be used singly or may be used in combination of two or more kinds thereof.

Examples of the (meth)acrylamide derivative include N,N-dimethylaminopropyl (meth)acrylamide, N,N-dimethyl (meth)acrylamide, N-isopropyl (meth)acrylamide, N,N-diethyl (meth)acrylamide, N-hydroxyethyl (meth)acrylamide, and (meth)acryloyl morpholine. These may be used singly or may be used in combination of two or more kinds thereof.

The compound having a radically polymerizable group may contain, in addition to the compound having a (meth)acryloyl group, for example, a copolymer compound copolymerizable therewith. Examples of the copolymer compound include compounds having a radically polymerizable group other than the (meth)acryloyl group such as styrene, 4-methylstyrene, vinylpyridine, vinylpyrrolidone, vinyl acetate, cyclohexylmaleimide, phenylmaleimide, and maleic anhydride.

The compound having a radically polymerizable group may be contained in at least one of the main agent and the initiator, and for example, the main agent may contain the compound having a radically polymerizable group.

The content of the compound having a radically polymerizable group may be 40% by mass or more, 50% by mass or more, 60% by mass or more, or 65% by mass or more, on the basis of the total amount of the main agent and the initiator, from the viewpoint of improving toughness of an adhesive layer and improving an adhesive strength. The content of the compound having a radically polymerizable group may be 99% by mass or less, 98% by mass or less, 95% by mass or less, or 90% by mass or less, on the basis of the total amount of the main agent and the initiator, from the viewpoint of suppressing sagging of the applied adhesive composition and suppressing a decrease in toughness of an adhesive layer.

At least one of the main agent and the initiator further contains a polymerization control agent. Examples of the polymerization control agent include a halogenated metal salt and a compound having a thiocarbonylthio structure. The polymerization control agent may be at least one selected from the group consisting of a halogenated metal salt and a compound having a thiocarbonylthio structure.

Examples of the halogenated metal salt include copper(II) bromide, copper(II) chloride, iron(III) bromide, vanadium (III) bromide, chromium(III) bromide, ruthenium(III) bromide, copper(I) bromide, iron(II) bromide, manganese (II) bromide, cobalt(II) bromide, nickel(II) bromide, and palladium(II) bromide. These may be used singly or may be used in combination of two or more kinds thereof. The halogenated metal salt may be, for example, copper(II) bromide.

The compound having a thiocarbonylthio structure can be used without particular limitations as long as it has a thiocarbonylthio structure, and for example, a chain transfer agent (RAFT agent) that is used in the field of RAFT polymerization (Reversible Addition/Fragmentation Chain Transfer) can be suitably used.

The polymerization control agent may be contained in at least one of the main agent and the initiator, and for example, the main agent may contain the polymerization control agent.

The content of the polymerization control agent may be 0.01% by mass or more, 0.02% by mass or more, 0.03% by mass or more, or 0.05% by mass or more, on the basis of the total amount of the main agent and the initiator, from the viewpoint of securing an operation time from application of the adhesive composition to adherends to pasting the adherends to each other and improving an adhesive strength. The content of the polymerization control agent may be 5% by mass or less, 3% by mass or less, 1% by mass or less, or 0.5% by mass or less, on the basis of the total amount of the main agent and the initiator, from the viewpoint of storage stability of the main agent.

The content of the polymerization control agent may be 0.01 mol % or more, 0.03 mol % or more, 0.05 mol % or more, or 0.08 mol % or more, on the basis of the total amount of the compound having a radically polymerizable group, from the viewpoint of securing an operation time from application of the adhesive composition to adherends to pasting the adherends to each other and improving an adhesive strength. The content of the polymerization control agent may be 5 mol % or less, 3 mol % or less, 1 mol % or less, or 0.7 mol % or less, on the basis of the total amount of the compound having a radically polymerizable group, from the viewpoint of storage stability of the main agent.

(Peroxide)

At least one of the main agent and the initiator further contains a peroxide. The peroxide can be used without particular limitations as long as it has —O—O— bond, and for example, a commercially available product can be used. These may be used singly or may be used in combination of two or more kinds thereof.

Examples of the commercially available product of the peroxide include PEROYL L (one-minute half-life temperature: 116° C., NOF CORPORATION), PERBUTYL O (one-minute half-life temperature: 134° C., NOF CORPORATION), PERBUTYL E (one-minute half-life temperature: 161° C., NOF CORPORATION), and PERCUMYL H (one-minute half-life temperature: 254° C., NOF CORPORATION). Among these, the peroxide may be a peroxide whose one-minute half-life temperature is 270° C. or lower from the viewpoint of reduction in curing time and storage stability. The one-minute half-life temperature of the peroxide may be, for example, 250° C. or lower, 220° C. or lower, 200° C. or lower, 180° C. or lower, 160° C. or lower, 150° C. or lower, 140° C. or lower, 135° C. or lower, 130° C. or lower, 125° C. or lower, or 120° C. or lower. The one-minute half-life temperature of the peroxide may be, for example, 80° C. or higher, 90° C. or higher, or 100° C. or higher.

The content of the peroxide may be 0.01% by mass or more, 0.03% by mass or more, 0.05% by mass or more, or 0.1% by mass or more, on the basis of the total amount of the main agent and the initiator, from the viewpoint of shortening the curing time. The content of the peroxide may be 5% by mass or less, 3% by mass or less, 2% by mass or less, or 1% by mass or less, on the basis of the total amount of the main agent and the initiator, from the viewpoint of storage stability.

The content of the peroxide may be 5 mol % or more, 10 mol % or more, 15 mol % or more, or 20 mol % or more, on the basis of the total amount of the organoborane complex, from the viewpoint of shortening the curing time. The content of the peroxide may be 90 mol % or less, 80 mol % or less, 70 mol % or less, or 60 mol % or less, on the basis of the total amount of the organoborane complex, from the viewpoint of storage stability.

The peroxide may be contained in at least one of the main agent and the initiator, and for example, the main agent may contain the peroxide.

(Filler)

The filler may be, for example, any of an inorganic filler and an organic filler. Examples of the inorganic filler include inorganic fine particles such as silica, alumina, silica-alumina, titania, zirconia, magnesia, kaolin, talc, calcium carbonate, bentonite, mica, sericite, glass flakes, glass fibers, graphite, magnesium hydroxide, aluminum hydroxide, antimony trioxide, barium sulfate, zinc borate, wollastonite, xonotlite, and whisker. Examples of the organic filler include organic fine particles such as silicone, acrylic silicone, acrylic rubber, MBS (methacrylate-butadiene-styrene), polyamide, and polyimide. These fillers (fine particles) may have a uniform structure, and may have a core-shell type structure. The filler may contain an organic filler and may contain acrylic core-shell particles from the viewpoint that the curing time can be more sufficiently shortened.

The filler may be contained in at least one of the main agent and the initiator. For example, the main agent may contain a filler containing an organic filler and may contain a filler containing acrylic core-shell particles from the viewpoint that the curing time can be more sufficiently shortened.

The organic filler contains an antioxidant in the organic filler in some cases. According to studies of the inventors of the present disclosure, it has been found that, as the amount of the antioxidant in the organic filler is smaller, the curing time can be further sufficiently shortened. The content of the antioxidant in the organic filler may be, for example, 15000 mass ppm or less, 10000 mass ppm or less, 5000 mass ppm or less, or 3000 mass ppm or less.

The content of the filler may be 1% by mass or more, 3% by mass or more, or 5% by mass or more and may be 40% by mass or less, 30% by mass or less, or 30% by mass or less, on the basis of the total amount of the main agent and the initiator.

(Plasticizer)

Examples of the plasticizer include a phthalic acid ester-based compound, an alkyl sulfonic acid ester-based compound, and an adipic acid ester-based compound.

The content of the plasticizer may be 0.1% by mass or more, 0.2% by mass or more, or 0.3% by mass or more and may be 30% by mass or less, 20% by mass or less, or 10% by mass or less, on the basis of the total amount of the main agent and the initiator.

(Cross-Linking Agent)

Examples of the cross-linking agent include an aziridine-based cross-linking agent and a carbodiimide-based cross-linking agent.

The content of the cross-linking agent may be 0.01% by mass or more, 0.1% by mass or more, or 0.5% by mass or more and may be 5% by mass or less, 3% by mass or less, or 2% by mass or less, on the basis of the total amount of the main agent and the initiator.

At least one of the main agent and the initiator may further contain an ultraviolet absorbing agent, a dehydrating agent, a pigment, a dye, an age resister, an antioxidant, an antistatic agent, a flame retardant, an adhesion imparting agent, a dispersant, a solvent, and the like, in addition to the above-described components.

In the adhesive set of the present embodiment, an adhesive composition can be prepared by mixing the main agent and the initiator. The temperature when the main agent and the initiator are mixed may be, for example, 10 to 35° C. The pot life of the adhesive set may be, for example, 0.1 to 3 minutes.

In the case of mixing the main agent and the initiator, the main agent and the initiator are preferably mixed so that the molar amount ratio of the decomplexing agent in the main agent with respect to the organoborane complex in the initiator (the molar amount of the decomplexing agent/the molar amount of the organoborane complex) is 0.3 or more, 0.5 or more, 0.8 or more, or 1 or more or is 50 or less, 30 or less, 10 or less, 7 or less, 5 or less, or 3 or less.

In the case of mixing the main agent and the initiator, the main agent and the initiator are preferably mixed so that the mass ratio of the main agent with respect to the initiator (the mass of the main agent/the mass of the initiator) is, for example, 1 or more, 3 or more, or 5 or more or is 200 or less, 100 or less, or 50 or less.

A method of mixing the main agent and the initiator is not particularly limited as long as both the main agent and the initiator are mixed. Examples of the method of mixing the main agent and the initiator include a manual mixing method, a mixing method with hand painting using a usual caulking gun, and a mixing method using a mechanical rotary mixer, a static mixer, or the like while concurrently using a quantitative pump for feeding a raw material (for example, a gear pump, a plunger pump, or the like) and a throttle valve.

The adhesive composition thus prepared can form an adhesive layer by applying the adhesive composition to a predetermined place. The adhesive layer thus formed acts as an adhesive layer bonding both base materials to each other since the molecular weight of the compound having a radically polymerizable group is gradually increased and the compound is cured. As the method of applying the adhesive composition to a predetermined place, a conventionally known method such as a method using a dispenser or the like can be applied.

The conditions under which the adhesive composition is cured may be, for example, a curing temperature of 10 to 35° C. and a curing time of 24 to 96 hours.

[Adhesive Body and Manufacturing Method Therefor]

An adhesive body of an embodiment includes a first adherend, a second adherend, and an adhesive layer bonding the first adherend and the second adherend to each other. The adhesive layer contains a cured product of an adhesive composition containing the main agent and the initiator of the above-described adhesive set.

Examples of the first adherend and the second adherend include plastic substrates such as polypropylene (PP), polyvinyl chloride, an acrylonitrile/butadiene/styrene copolymer (ABS), polycarbonate (PC), polyamide (PA), poly(methyl methacrylate (PMMA), polyester, an epoxy resin, polyurethane (PUR), polyoxymethylene (POM), polyethylene (PE), an ethylene/propylene copolymer (EPM), and an ethylene/propylene/diene polymer (EPDM), and metal substrates such as aluminum, steel, copper, and stainless steel.

Examples of the adhesive body include plastic laminate substrates, metal laminate substrates, electronic components, semiconductor components, and display components.

A method for manufacturing the adhesive body of an embodiment includes pasting the first adherend and the second adherend together with the adhesive composition containing the main agent and the initiator. The temperature when the main agent and the initiator of the adhesive set are mixed, the conditions under which the adhesive composition is cured, and the like may be the same as described above.

EXAMPLES

Hereinafter, the present disclosure will be more specifically described by means of Examples. However, the present disclosure is not limited to these Examples.

Examples 1 to 6 and Comparative Example 1

[Production of Adhesive Set]
(Preparation of Raw Materials)
Organoborane Complex
　TEB-DAP: triethylborane-1,3-diaminopropane complex (molecular weight: 172.1, KISHIDA CHEMICAL Co., Ltd.)

Decomplexing Agent

Succinic anhydride (molecular weight: 100.1, FUJIFILM Wako Pure Chemical Corporation)

Compound having a radically polymerizable group (polymerizable compound)

FA-513AS: dicyclopentanyl acrylate (molecular weight: 206.3, Showa Denko Materials Co., Ltd.)

FA-310A: phenoxyethyl acrylate (molecular weight: 192.2, Showa Denko Materials Co., Ltd.)

Acrylamide: N,N-dimethyl methacrylamide (molecular weight: 113.2, FUJIFILM Wako Pure Chemical Corporation) Polymerization control agent Copper(II) bromide (molecular weight: 223.4, FUJIFILM Wako Pure Chemical Corporation)

Peroxide

PEROYL L (molecular weight: 398.6, one-minute half-life temperature: 116° C., NOF CORPORATION)

PERBUTYL O (molecular weight: 216.3, one-minute half-life temperature: 134° C., NOF CORPORATION)

PERCUMYL H (molecular weight: 152.0, one-minute half-life temperature: 254° C., NOF CORPORATION)

Filler

RY200S: fumed silica (hydrophobic fumed silica surface-treated with silicone oil, NIPPON AEROSIL CO., LTD.)

B564: MBS-based core-shell particles (KANEKA CORPORATION, containing, as an antioxidant, Irganox PS 800:7800 mass ppm and Irganox 245:6000 mass ppm)

M210: acrylic core-shell particles (KANEKA CORPORATION, antioxidant not detected)

Plasticizer

PN-5090: adipic acid polyester (ADEKA Corporation)

Cross-Linking Agent

Triaziridine: tris [3-(1-aziridinyl)propionic acid]trimethylol propane (FUJIFILM Wako Pure Chemical Corporation)

(Preparation of Main Agent)

The decomplexing agent, the compound having a radically polymerizable group, the polymerization control agent, the peroxide, and the filler were weighed out and placed in a plastic bottle according to types and ratios (unit:parts by mass) shown in Table 1 and Table 2, mixed using a rotation/ revolution mixer (THINKY CORPORATION, Awatori Rentarou) for 15 minutes under the condition of 2000 revolutions/min, and further deaerated for 5 minutes under the condition of 2000 revolutions/min, thereby preparing each main agent of Examples 1 to 6 and Comparative Example 1.

(Preparation of Initiator)

The organoborane complex, the plasticizer, the crosslinking agent, and the filler were weighed out and placed in a plastic bottle according to types and ratios (unit:parts by mass) shown in Table 1 and Table 2, mixed using a rotation/ revolution mixer (THINKY CORPORATION, Awatori Rentarou) for 15 minutes under the condition of 2000 revolutions/min, and further deaerated for 5 minutes under the condition of 2000 revolutions/min, thereby preparing each initiator of Examples 1 to 6 and Comparative Example 1. Note that, the initiators of Examples 1 to 6 and Comparative Example 1 are the same component.

[Measurement of Adhesive Strength]

A 0.5-mm spacer was disposed between two polypropylene substrates (adherends) (size: 100 mm×25 mm, thickness: 2 mm) so that the thickness of the adhesive layer was 0.5 mm. Each main agent and each initiator were filled in a manual dispenser so as to mix the main agent and the initiator. The resultant mixture was applied to the portion between the polypropylene substrates using the manual dispenser, and the polypropylene substrates were pasted to each other to obtain a laminate. A plurality of the laminates were produced. The laminate thus obtained was left to stand at 25° C., the shear strength was measured at every predetermined time, and a change in shear strength with respect to the curing time was determined. Results are shown in FIG. 1 and FIG. 2.

TABLE 1

|  |  |  | Exam. 1 | Exam. 2 | Comp. Exam. 1 |
|---|---|---|---|---|---|
| Main agent | Decomplexing agent | Succinic anhydride | 0.34 | 0.35 | 0.35 |
|  | Polymerizable compound | FA-513AS | 37.68 | 37.79 | 37.98 |
|  |  | FA-310A | 37.72 | 37.82 | 37.98 |
|  |  | Acrylamide | 1.11 | 1.41 | 1.12 |
|  | Polymerization control agent | Copper(II) bromide | 0.08 | 0.09 | 0.09 |
|  | Peroxide | PEROYL L | 0.69 | — | — |
|  |  | PERBUTYL O | — | 0.22 | — |
|  |  | PERCUMYL H | — | — | — |
|  | Filler | B564 | 22.38 | 22.32 | 22.48 |
|  |  | M210 | — | — | — |
| Total amount of main agent |  |  | 100.00 | 100.00 | 100.00 |
| Initiator | Organoborane complex | TEB-DAP | 0.60 | 0.60 | 0.60 |
|  | Plasticizer | PN-5090 | 7.93 | 7.93 | 7.93 |
|  | Cross-linking agent | Triaziridine | 1.11 | 1.11 | 1.11 |
|  | Filler | RY200S | 0.36 | 0.36 | 0.36 |
| Total amount of initiator |  |  | 10.00 | 10.00 | 10.00 |
| Molar amount of decomplexing agent/molar amount of organoborane complex |  |  | 1.0 | 1.0 | 1.0 |
| Mass of main agent/mass of initiator |  |  | 10.0 | 10.0 | 10.0 |

Figure 2:
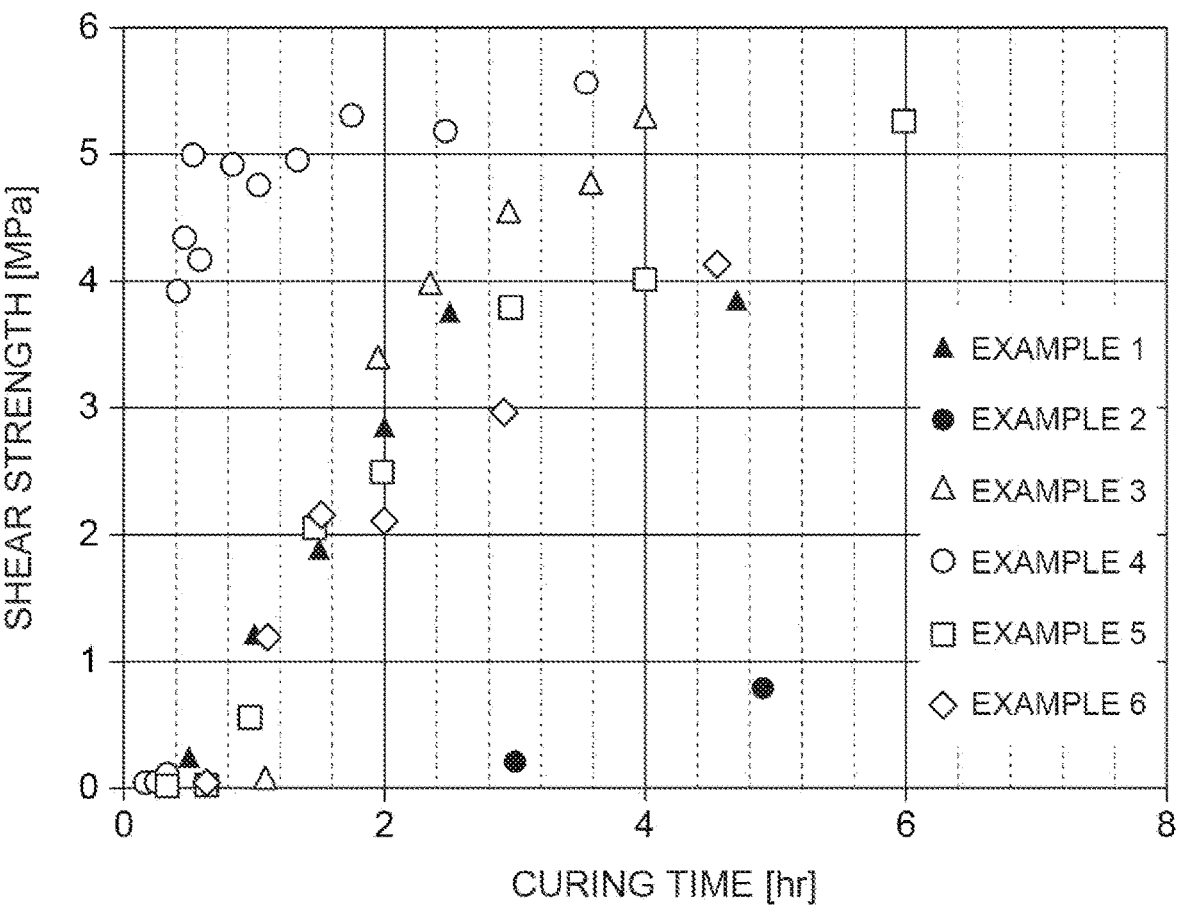
FIG. 2 is a graph showing a change in shear strength with respect to a curing time of Examples 1 to 6.

FIG. 1 is a graph showing a change in shear strength with respect to a curing time of Examples 1 and 2 and Comparative Example 1. As shown in FIG. 1, the time until a sufficient adhesive strength is obtained was shortened in the adhesive composition containing a peroxide which was prepared from the adhesive set of each of Examples 1 and 2 as compared to the adhesive composition not containing a peroxide which was prepared from the adhesive set of Comparative Example 1. From these results, it was confirmed that the adhesive set of the present disclosure enables an adhesive composition having a sufficient adhesive strength and capable of shortening a curing time to be prepared.

TABLE 2

| | | | Exam. 3 | Exam. 4 | Exam. 5 | Exam. 6 |
|---|---|---|---|---|---|---|
| Main agent | Decomplexing agent | Succinic anhydride | 0.34 | 0.35 | 0.34 | 0.34 |
| | Polymerizable compound | FA-513AS | 39.18 | 39.37 | 39.54 | 39.96 |
| | | FA-310A | 39.11 | 39.34 | 39.51 | 40.18 |
| | | Acrylamide | 2.04 | 2.12 | 1.43 | 0.50 |
| | Polymerization control agent | Copper(II) bromide | 0.16 | 0.16 | 0.25 | 0.09 |
| | Peroxide | PEROYL L | 0.41 | 0.55 | — | — |
| | | PERBUTYL O | — | — | — | — |
| | | PERCUMYL H | — | — | 0.21 | 0.07 |
| | Filler | B564 | — | — | — | — |
| | | M210 | 18.76 | 18.11 | 18.72 | 18.86 |
| | Total amount of main agent | | 100.00 | 100.00 | 100.00 | 100.00 |
| Initiator | Organoborane complex | TEB-DAP | 0.60 | 0.60 | 0.60 | 0.60 |
| | Plasticizer | PN-5090 | 7.93 | 7.93 | 7.93 | 7.93 |
| | Cross-linking agent | Triaziridine | 1.11 | 1.11 | 1.11 | 1.11 |
| | Filler | RY200S | 0.36 | 0.36 | 0.36 | 0.36 |
| | Total amount of initiator | | 10.00 | 10.00 | 10.00 | 10.00 |
| Molar amount of decomplexing agent/molar amount of organoborane complex | | | 1.0 | 1.0 | 1.0 | 1.0 |
| Mass of main agent/mass of initiator | | | 10.0 | 10.0 | 10.0 | 10.0 |

FIG. 2 is a graph showing a change in shear strength with respect to a curing time of Examples 1 to 6. As shown in FIG. 2, the time until a sufficient adhesive strength is obtained was shortened in the adhesive composition containing a peroxide which was prepared from the adhesive set of each of Examples 3 to 6 at the same level as in the adhesive composition containing a peroxide which was prepared from the adhesive set of each of Examples 1 and 2. Also from these results, it was confirmed that the adhesive set of the present disclosure enables an adhesive composition having a sufficient adhesive strength and capable of shortening a curing time to be prepared.

The invention claimed is:

1. An adhesive set comprising:
a main agent comprising a decomplexing agent; and
an initiator comprising an organoborane complex, wherein
at least one of the main agent and the initiator further comprises a compound having a radically polymerizable group,
at least one of the main agent and the initiator further comprises a polymerization control agent,
at least one of the main agent and the initiator further comprises a peroxide, and
the polymerization control agent comprises at least one selected from the group consisting of a halogenated metal salt and a compound having a thiocarbonylthio structure.

2. An adhesive body comprising:
a first adherend;
a second adherend; and
an adhesive layer interposed between the first adherend and the second adherend, the adhesive layer bonding the first adherend and the second adherend to each other, wherein the adhesive layer comprises a cured product of an adhesive composition comprising the main agent and the initiator of the adhesive set according to claim 1.

3. A method for manufacturing the adhesive body according to claim 2, the method comprising:
pasting the first adherend and the second adherend together with the adhesive composition comprising the main agent and the initiator.

4. The adhesive set according to claim 1, wherein the initiator further comprises a filler, a cross-linking agent, and a plasticizer.

5. The adhesive set according to claim 1, wherein the main agent comprises the compound having the radically polymerizable group, the polymerization control agent, and the peroxide.

6. The adhesive set according to claim 5, wherein the main agent further comprises a filler.

7. The adhesive set according to claim 1, wherein the polymerization control agent comprises the halogenated metal salt.

8. An adhesive composition consisting essentially of:
a decomplexing agent;
an organoborane complex;
a compound having a radically polymerizable group;
a polymerization control agent;
a peroxide;
a filler;
a cross-linking agent; and
a plasticizer,
wherein the polymerization control agent comprises at least one selected from the group consisting of a halogenated metal salt and a compound having a thiocarbonylthio structure.

* * * * *